US010742140B2

(12) United States Patent
Yao et al.

(10) Patent No.: US 10,742,140 B2
(45) Date of Patent: Aug. 11, 2020

(54) MAGLEV MODULE WITH MTL CONTROL SYSTEM IN FURNITURE AND ICE-BREAKING VESSEL

(71) Applicants: Kang Yao, Delray Beach, FL (US); Nan An, Boynton Beach, FL (US)

(72) Inventors: Kang Yao, Delray Beach, FL (US); Nan An, Boynton Beach, FL (US)

(73) Assignee: Kang Yao, Delray Beach, FL (US)

( * ) Notice: Subject to any disclaimer, the term of this patent is extended or adjusted under 35 U.S.C. 154(b) by 0 days.

(21) Appl. No.: 15/892,838

(22) Filed: Feb. 9, 2018

(65) Prior Publication Data
US 2019/0253007 A1  Aug. 15, 2019

(51) Int. Cl.
| | | |
|---|---|---|
| *H02N 15/00* | (2006.01) | |
| *B63B 35/08* | (2006.01) | |
| *A47C 17/86* | (2006.01) | |
| *A47C 17/04* | (2006.01) | |
| *B64D 11/06* | (2006.01) | |

(52) U.S. Cl.
CPC ........... *H02N 15/00* (2013.01); *B63B 35/083* (2013.01); *A47C 17/04* (2013.01); *A47C 17/86* (2013.01); *B64D 11/0643* (2014.12)

(58) Field of Classification Search
CPC .. H02N 15/00; B63B 35/083; B64D 11/0643; A47C 17/04; A47C 17/86
USPC ....................................................... 310/12.05
See application file for complete search history.

(56) References Cited

U.S. PATENT DOCUMENTS

| | | | | |
|---|---|---|---|---|
| 3,604,027 A | * | 9/1971 | Konno ................. | A47C 23/043 5/697 |
| 5,103,513 A | * | 4/1992 | King ........................ | A47C 7/14 5/118 |
| 5,473,313 A | * | 12/1995 | Graebe, Jr. .............. | A47C 4/54 297/452.41 |
| 7,941,882 B1 | * | 5/2011 | Strozer ................ | A47C 31/003 5/693 |
| 8,570,130 B1 | * | 10/2013 | Fullerton ................ | E05C 19/16 200/404 |
| 2009/0066452 A1 | * | 3/2009 | Hsu ....................... | A47C 27/065 335/306 |
| 2010/0268121 A1 | * | 10/2010 | Kilborn .................. | A61G 7/057 600/587 |

(Continued)

FOREIGN PATENT DOCUMENTS

JP           08140782 A  *  6/1996  ........... A47C 31/003

*Primary Examiner* — Alex W Mok

(57) ABSTRACT

The present invention relates to a innovative magnetic tension lock(MTL) control system which guides the MagLev module in both vertical and horizontal movement. The MagLev module moves on its inherent magnetic force and is guided by the MTL control system. The MagLev module with MTL control system can be used in products of various applications. It can be made at efficient cost to perform unique function. It can provide magnetic cushioning, which is great for seat, bed and other body-supporting furniture. It can also be applied as a cushioning layer against outside impact, thus it can be mounted onto the surface of heavy duty equipment or even the vessel sailing in icy water. It functions on its magnetic energy for load capacity and only requires compact battery power for its MTL control system. Thus it saves energy and reduces impact on the environment. It can replace the traditional MagLev module that runs on electricity otherwise.

9 Claims, 17 Drawing Sheets

MagLev module with MTL control system

MagLev module with MTL control system

(56) References Cited

U.S. PATENT DOCUMENTS

2016/0252071 A1* 9/2016 Phillips .................. F03B 13/16
                                                    290/50
2016/0356333 A1* 12/2016 Stein ...................... A47C 3/023

* cited by examiner

Top perspective section view of MagLev module with MTL control system attaching to the hull of ice-breaking vessel or heavy equipment Programmable oscillator circuit

MAGLEV MODULE WITH MTL CONTROL SYSTEM IN FURNITURE AND ICE-BREAKING VESSEL

BACKGROUND OF THE INVENTION

Situations arise where vibration-damping isolation of a mattress or seat cushion from its support frame would be highly desirable. To supplement the current body-supporting furniture such as the traditional chair or bed, our MagLev module with MTL control system provides an innovative solution to enable the chair or bed function via magnet repulsion.

Magnetic cushioning of mattresses and seats are disclosed in certain prior patents. U.S. Pat. No. 3,604,027 shows the use of electromagnets mounted on spaced-apart plates in a seat cushion, one plate being secured to the seat frame and the other to the underside of the seat cushion. Mechanical springs coupling the upper and lower plates are also provided. However, this magnetic cushioning structure does not provide effective isolation of the seat cushion from horizontal vibrations.

Another approach is disclosed in U.S. Pat. No. 5,103,513 wherein a magnetically supported structure of a mattress or seat includes a pair of spaced-apart, aligned sheets of non-magnetic material, each sheet having magnets disposed on its inner face in opposition to magnets on the other sheet, with the opposing magnet faces in each magnet pair having like polarity. This is a new approach to design and making bed by combining the MagLev force and the elasticity of the low-density polymer material. Yet, its traditional mechanical mounting structure limits its ability to move freely sidewise. U.S. Pat. No. 7,941,882 discloses a magnetic cushioning system for use in a cushion, mattress or other cushioned article, the cushioning system providing adjustable firmness for the user. The magnetic cushioning system includes a plurality of magnetic supports enclosed within the cover. Each of the magnetic supports has a flexible shell of opposed upper and lower ends. A permanent magnet is disposed within the flexible shell and is positioned adjacent to the upper end. This article offers a way to adjust firmness along the length of the bed or across its width. It involves an electro-magnetic system that provides adjustable firmness at multiple locations along the mattress.

This article sheds new light into the bed design by providing extra comfort to the sleeper through the embedded MagLev units. Yet, it takes too many coil-like units in order to function as a MagLev bed and the cost of making such a system could be high. Compared with the prior arts, our MagLev module with MTL control system applied in furniture such as the MagLev bed has the advantage that the mattress can be independently laid on top of the module since our MagLev module is compact in design and easy to use. Due to the simplicity in design and application, it also makes the horizontal movement possible, i.e., the bed can gently swing thanks to the special MTL control system, where a compact electromagnet is installed next to the MTL control system. It can generate horizontal swing in given direction, which is controlled via the electromagnet and its interaction with the permanent magnet in the MTL control system. This function helps relax the person and put him into a solid sleep. With the built-in magnetic field, it can also provide mild magnetic massage to the person on the bed. This system is simple in design and easy to make. It is affordable to use thanks to its design and low cost in maintenance. It can be used in a wide variety of products such as MagLev bed, MagLev chair and MagLev protection layer for heavy duty equipment or even marine vessels. For example, the heavy-duty MagLev module with MTL control system can be mounted outside the hull of the vessel sailing in the icy water. It can provide extra protection and magnetic cushioning from any physical impact. In this case, the compression of the module absorbs most of the impact energy and saves the vessel from major damage. Further, our MagLev module with MTL control system is designed with environment protection in mind, the major components of the system are recyclable and can be re-assembled into the new system, which in turn lowers the manufacturing and operation cost as well.

SUMMARY OF THE INVENTION

The present invention relates to MagLev module with MTL control system for a chair or bed, more particularly, to a chair or a bed having an adjustable magnetic cushioning gap. The MagLev module with MTL control system comprises:

(1) pairs of magnets to form the MagLev module.

(2) magnet mounting plate(made by wood, plastic molding or metal etc.)

(3) MTL control system to connect and guide the vertical movement of the MagLev module.

(4) electromagnet to control the horizontal movement of MagLev module

In the MagLev module with MTL control system, the pairs of magnets are assembled with mounting plate to form the basis of the module The pair of magnets can be any in shape, size, grade and quantity. Here, for the purpose of simple illustration, we use the module of disc magnet. Yet this module structure also applies to other shape of paired magnets, such as square, rectangular or even polygon etc. Mounting holes are drilled on the magnet mounting plates at the center position between the pairs of permanent magnets of the MagLev modules. The guide rod is used to connect and guide the movement of the MagLev modules. The guide rod is inserted through the mounting holes of the pair of the MagLev modules and secured by the mounting head via an adjustable tension spacer. The adjustable tension spacer sets the tension level of the Maglev Modules which in turn fine tunes the magnetic repulsion force of the module. The guide rod moves freely inside the mounting holes. The MTL control system can guide the vertical spring-like compression and more importantly the horizontal swing of the MagLev module. This is achieved by adjusting the tension spacer on the guide rod and tuning the strength of the nearby electromagnet. The margin for the horizontal swing equals the margin between the guide rod and its mounting hole. The intensity and the frequency of the horizontal swing can be adjusted through the control circuit of the electromagnet.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in each drawing. In the drawings:

In FIG. 1, the MagLev module with MTL control system contains a MagLev module consisting of two pairs of magnets which is suitable for light duty magnetic cushioning.

In FIG. 2, a detailed structure of MTL control system is illustrated in a MagLev module of three pairs of magnets. Each MTL control system comprises one set or more than one set of rod, mounting head and tension spacer. The MTL control system is aligned in the MagLev module, i.e., the sets of the rod of the MTL control systems connect and retain the top and bottom mounting plates evenly by its insertion into the mounting holes drilled in the center between the pairs of magnets. The innovative tension spacer is used to adjust the vertical margin of the module. In FIG. 3, the working surface of each magnet is of same polarity and the pair of magnets repels each other. There is a small margin between rod and the mounting hole allowing for horizontal swing.

In FIG. 4a, the chair is assembled using MagLev module with MTL control system. Generally, the MagLev module with MTL control system can be integrated into a seat to form the magnetic cushion. In FIG. 4b, the MagLev module with MTL control system is integrated into the airline seat to form a unique magnetic cushioning seat. This line of the luxury seat provides magnetic cushioning without special power requirement since the MTL control system can function manually without the use of electromagnet. This type of airline seat can provide more comfort to the passenger at a low cost.

In FIG. 5 and FIG. 6, for the protection of the ice-breaking vessel, the heavy-duty MagLev module with MTL control system is installed next to the hull of the vessel. It provides a flexible layer of protection against the crushing ice. It functions as a layer of magnetic armor. Once in contact, the MagLev module with MTL control system can generate continuous push against the surrounding ice, thus clearing its pathway. The MagLev module with MTL control system functions as extra safety layer based on the current ice-breaking vessel hull design and can be easily installed or detached in any situation.

In FIG. 7, the MagLev module with MTL control system is assembled onto the hull of the ice-breaking vessel via stud welding structure. It can also be mounted in the same way to the surface of a heavy equipment. Due to its simplicity in design and installation and the relatively low cost, regular vessel of certain tonnage can also be converted into the one with basic ice-breaking function using our MagLev module with MTL control system. The converted vessel can then sail in light to mid-level ice covered waters(not recommended for tough arctic sea).

As illustrated in FIG. 8a, FIG. 8b and FIG. 8c, there are three ways to control the horizontal swing of the MagLev module with MTL control system. FIG. 8a illustrates the basic configuration, where a single electromagnet is embedded to pull or push the guide rod in the MTL control system and hence the swing of the MagLev module. Oscillation circuit in the single electromagnet can alternate the current direction and consequently the direction of the electromagnetic force. Coupled with the embedded permanent magnet around the guide rod, it generates pull or push which then enables the swing of the MagLev module. The power driving the electromagnet can be from the high capacity battery or AC input. FIG. 8b shows a configuration by using a pair of electromagnets, which interacts with each other guiding the swing of the MagLev module. In this configuration, the use of two electromagnets with seamless current adjustment maximizes the swing experience of the seat or bed where the the MagLev module is installed. In FIG. 8c, a spring coil is used to interact with an electromagnet forming a simple swing control configuration. This configuration can be installed into one or both ends of the MagLev module (i.e., top and bottom mounting plates) to control the swing. FIG. 9a shows a basic oscillator circuit and FIG. 9b shows programmable oscillator.

In FIG. 10a, the MagLev module is in the original position. In FIG. 10b, the electromagnet is powered on and the MagLev module moves off its original position, the top and bottom module start to move along the opposite direction horizontally. The MagLev module can move a short distance until the guide rod reaches the limit of the mounting hole.

In FIG. 10c, the guide rod starts moving back toward the original position after it reaches the swing limit. In FIG. 10d, the MagLev module is back to the original position and then toward the other side. This movement continues in the form of swing. This series of MagLev module swing is driven by the magnetic force between the electromagnet and the permanent magnet installed around the guide rod. It can also swing manually, i.e., the person on top of the MagLev module with the MTL control system can swing the module since the system is designed to move at minimum friction.

REFERENCE

Figure 1:
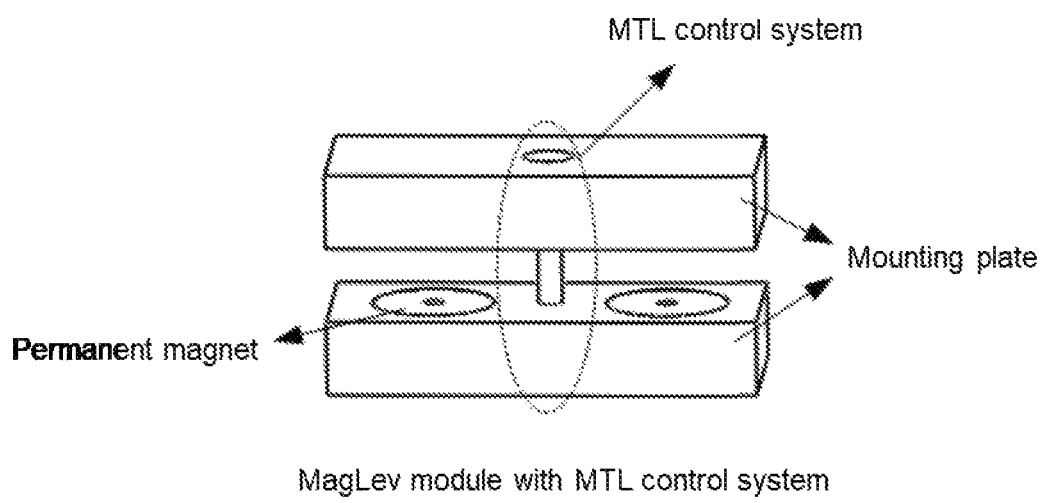
FIG. 1 shows a perspective view of MagLev module with MTL control system consisting of two pairs of magnets.
Figure 2:
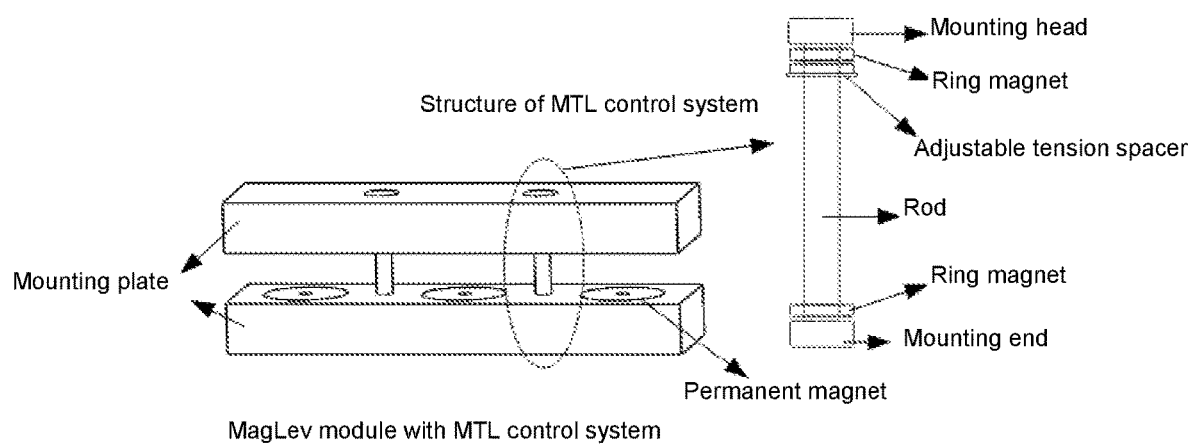
FIG. 2 shows a perspective view of structure of MagLev module with MTL control system consisting of three pairs of magnets and the detailed structure of MTL control system.
Figure 3:
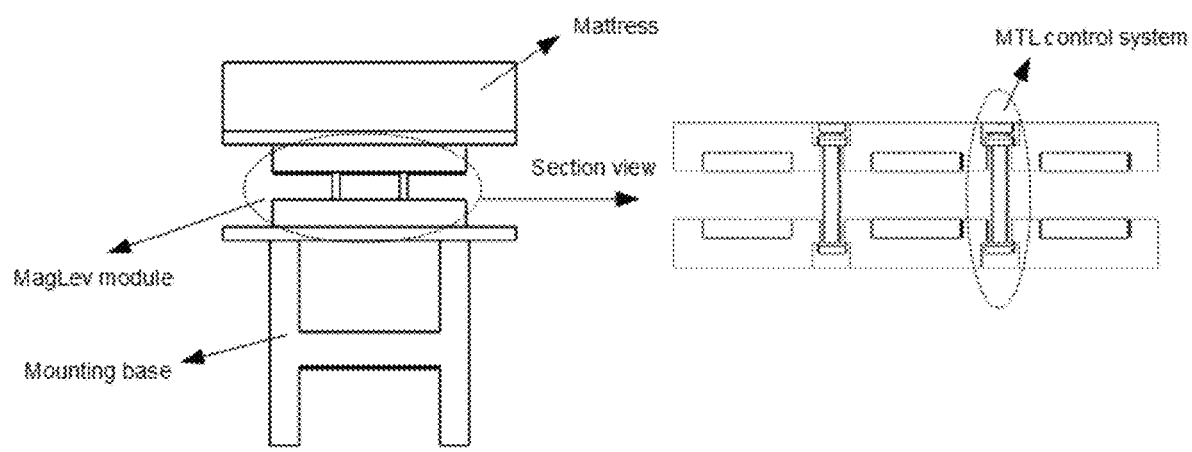
FIG. 3 shows a perspective view of magnetic cushioned bed system incorporating MagLev module with MTL control system.
Figure 4A:
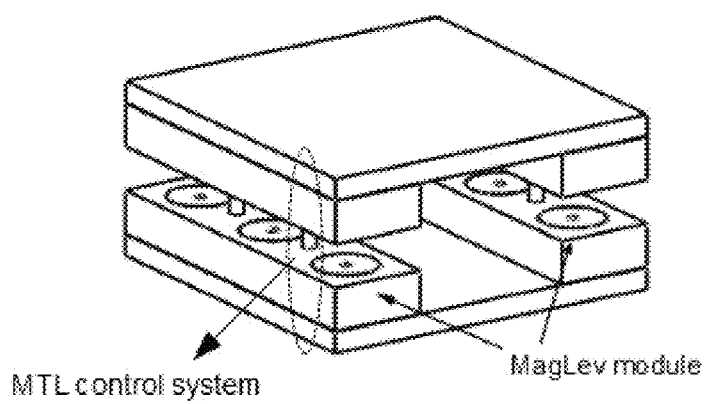
FIG. 4a shows a perspective view of magnetic cushioned seat incorporating MagLev module with MTL control system.
Figure 4B:
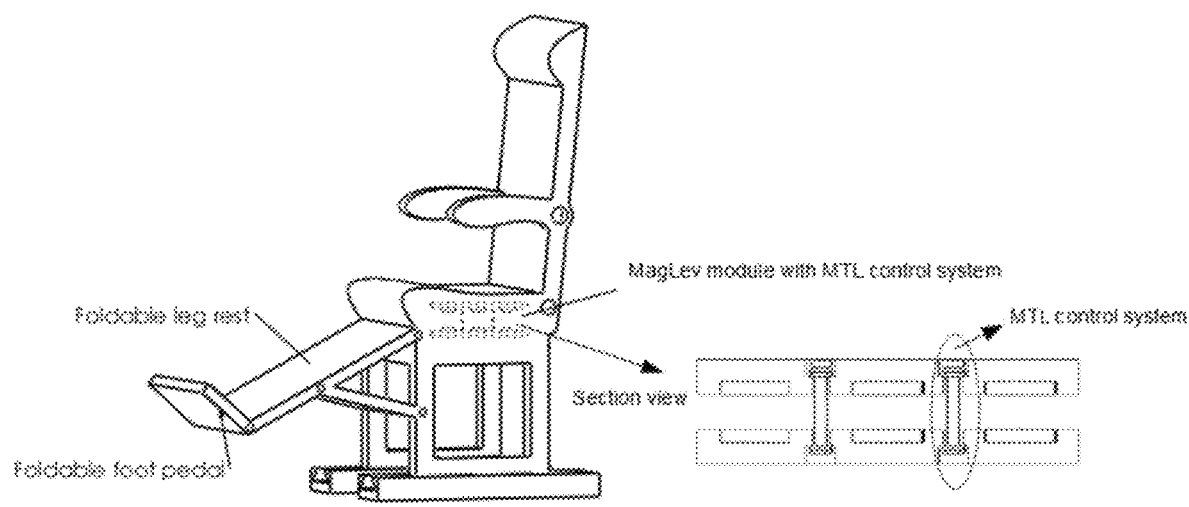
FIG. 4b shows a perspective view of structure of airline seat incorporating MagLev module with MTL control system.
Figure 5:
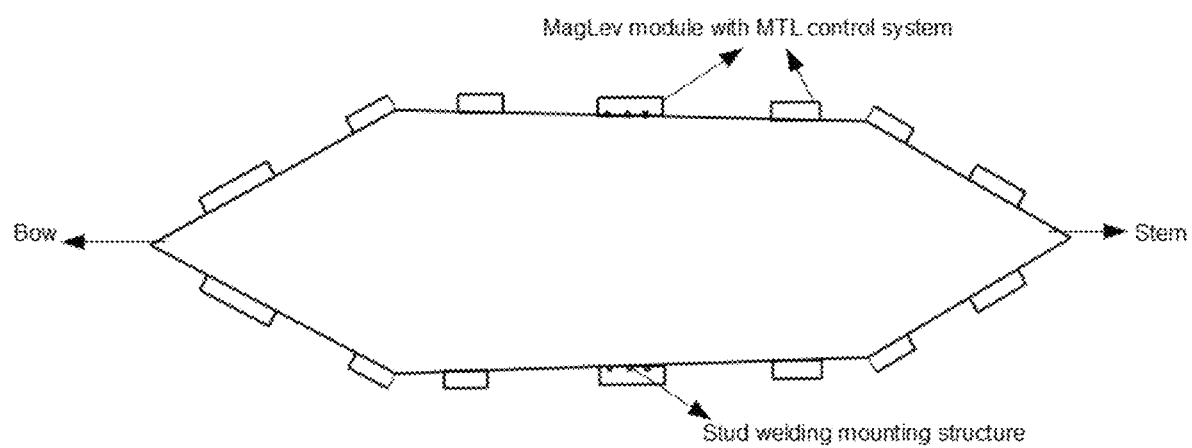
FIG. 5 shows a cross-section perspective view of ice-breaking vessel incorporating MagLev module with MTL control system.
Figure 6:
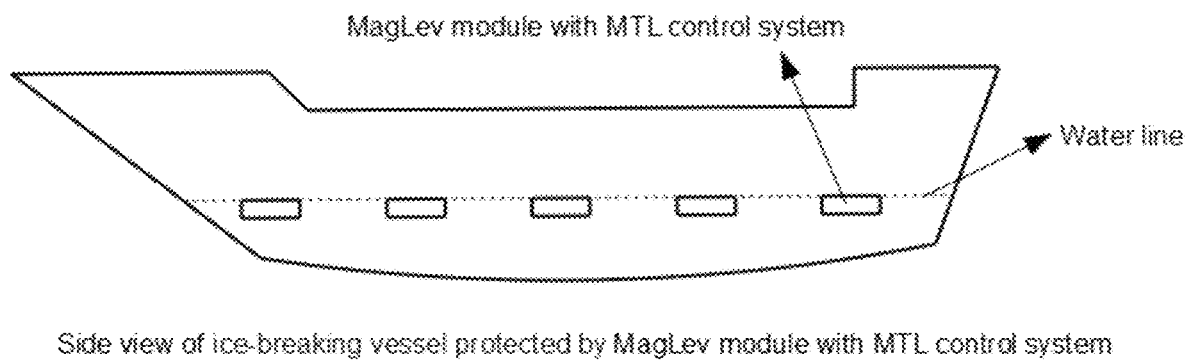
FIG. 6 shows a side perspective view of ice-breaking vessel incorporating MagLev module with MTL control system.
Figure 7:
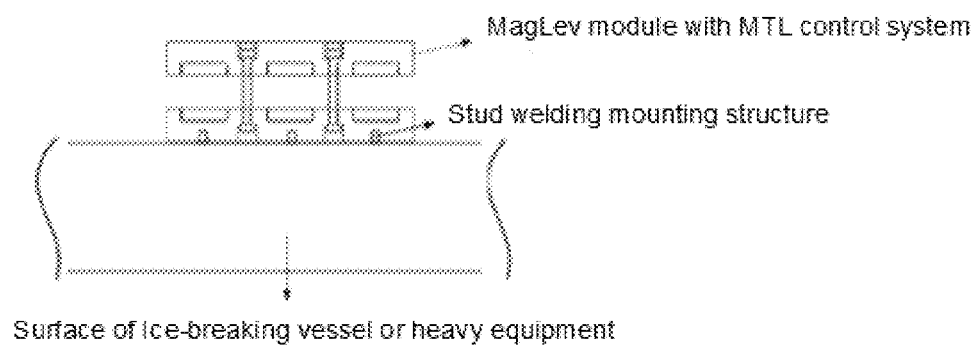
FIG. 7 shows a perspective view of stud welding connection between the heavy equipment or ice-breaking vessel and MagLev module with MTL control system.
Figure 8A:
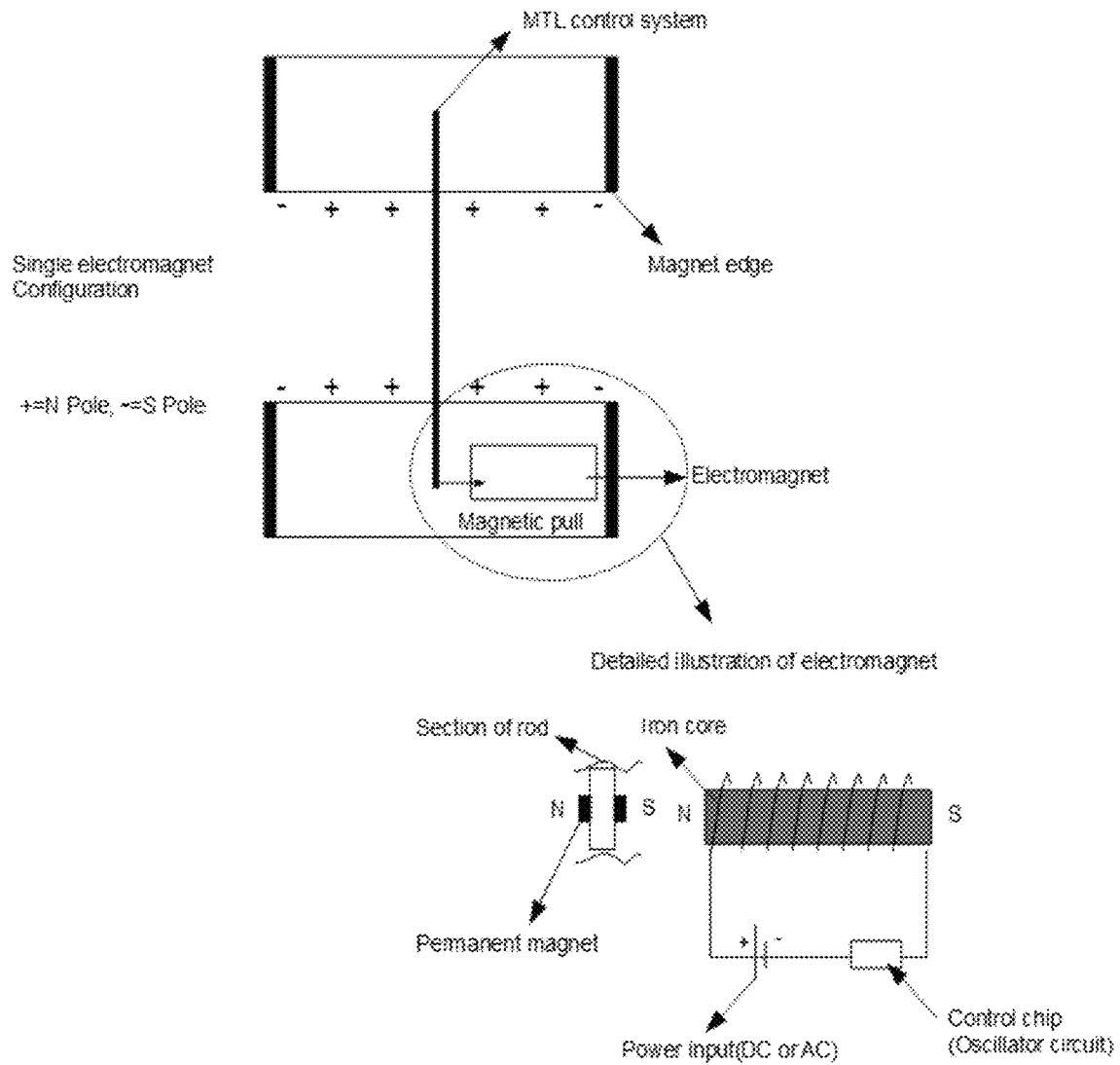
FIG. 8a shows an illustration of MagLev module with MTL control system using single electromagnet configuration for swing control.
Figure 8B:
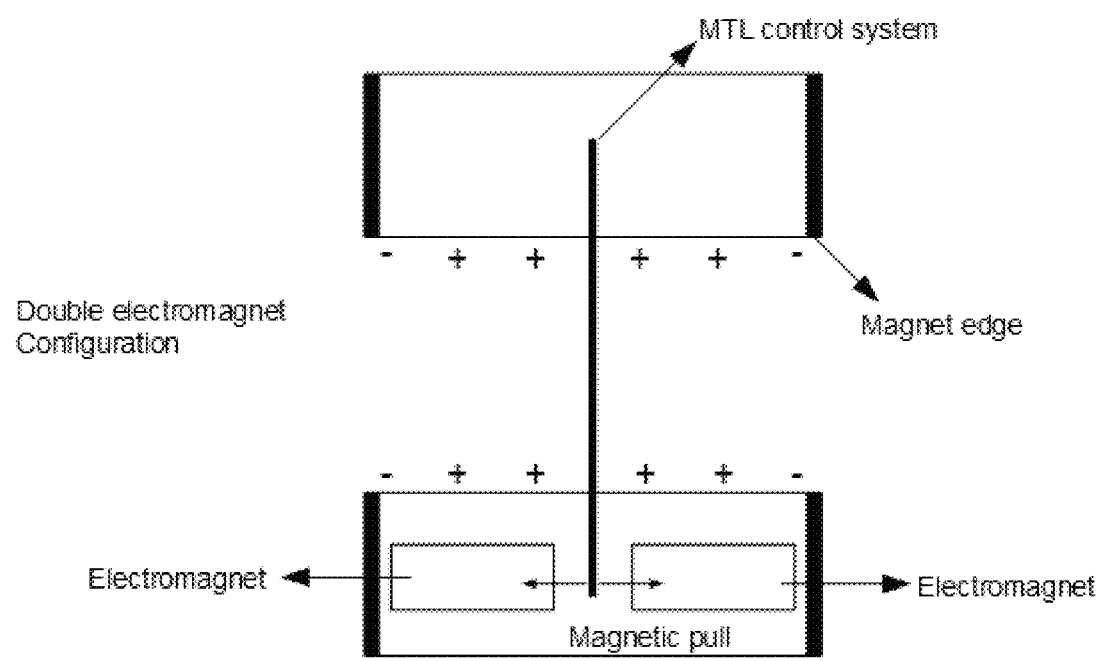
FIG. 8b shows an illustration of MagLev module with MTL control system using two electromagnets for swing control.
Figure 8C:
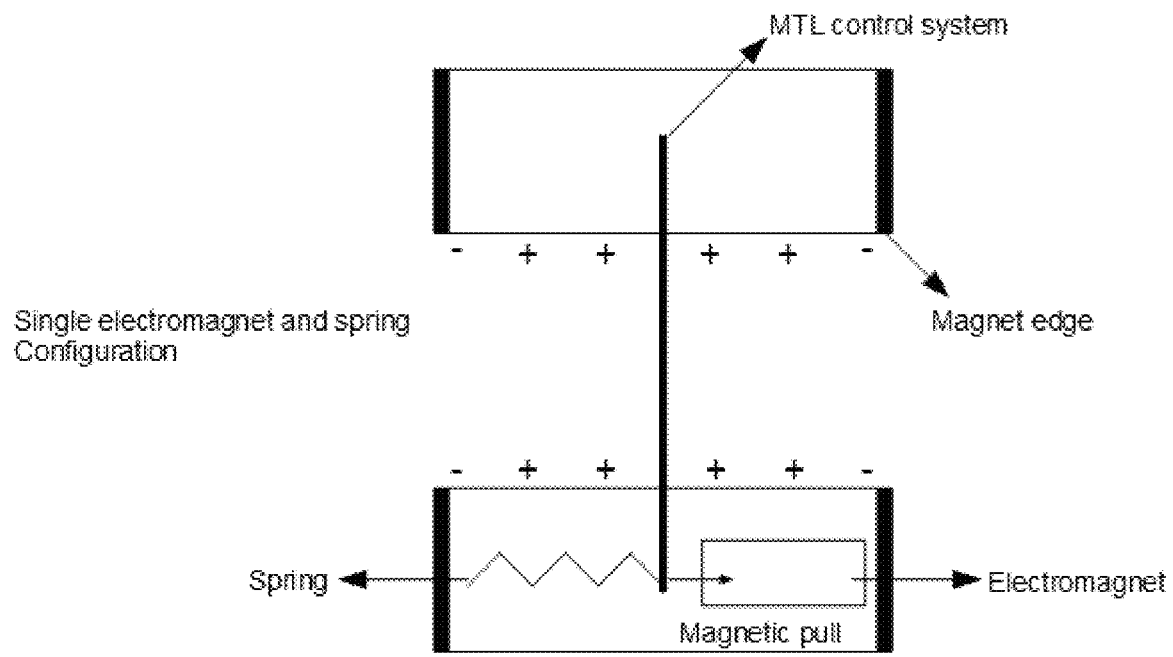
FIG. 8c shows an illustration of MagLev module with MTL control system using a spring and an electromagnet for swing control.
Figure 9A:
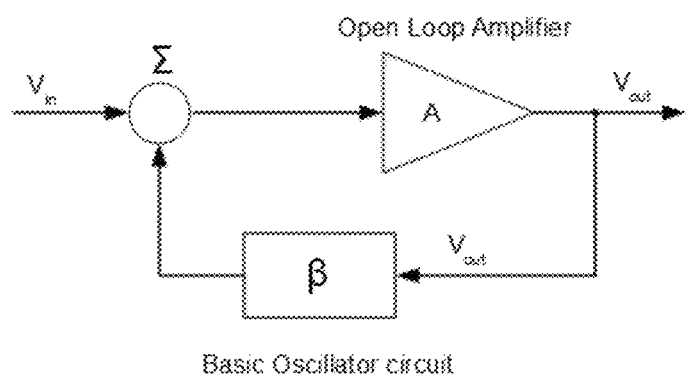
FIG. 9a shows a basic oscillator circuit.
Figure 9B:
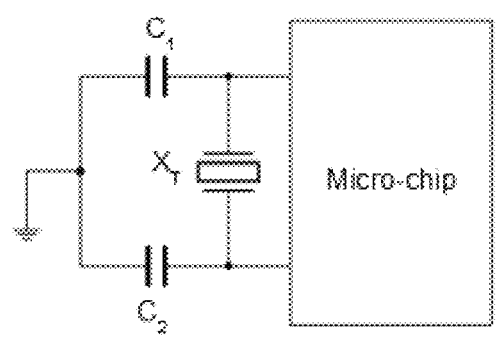
FIG. 9b shows a programmable oscillator circuit.
Figure 10A:
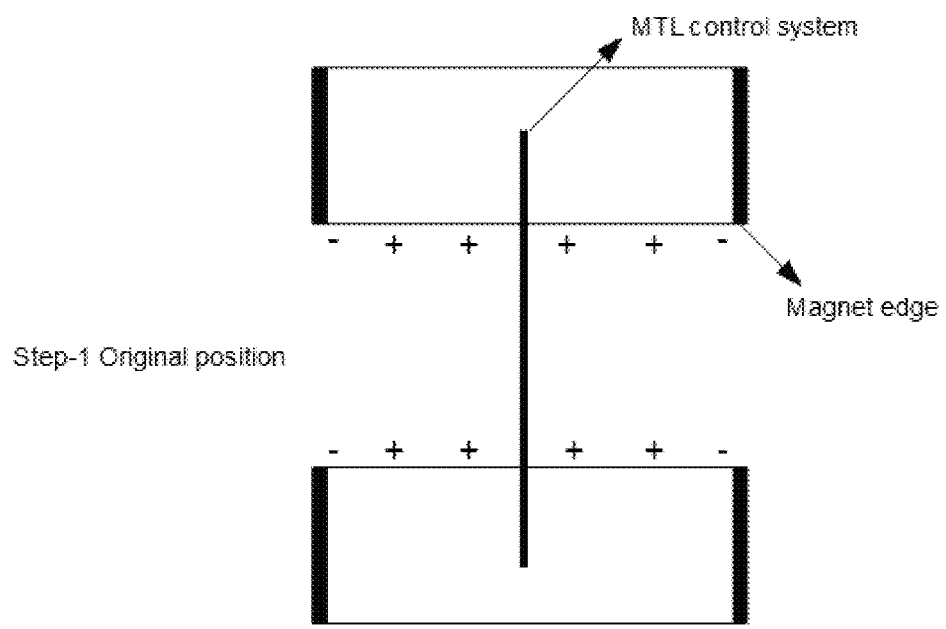
FIG. 10a to FIG. 10d show a series of illustration depicting the steps of the swing of the MagLev module caused by the electromagnet.
Figure 10B:
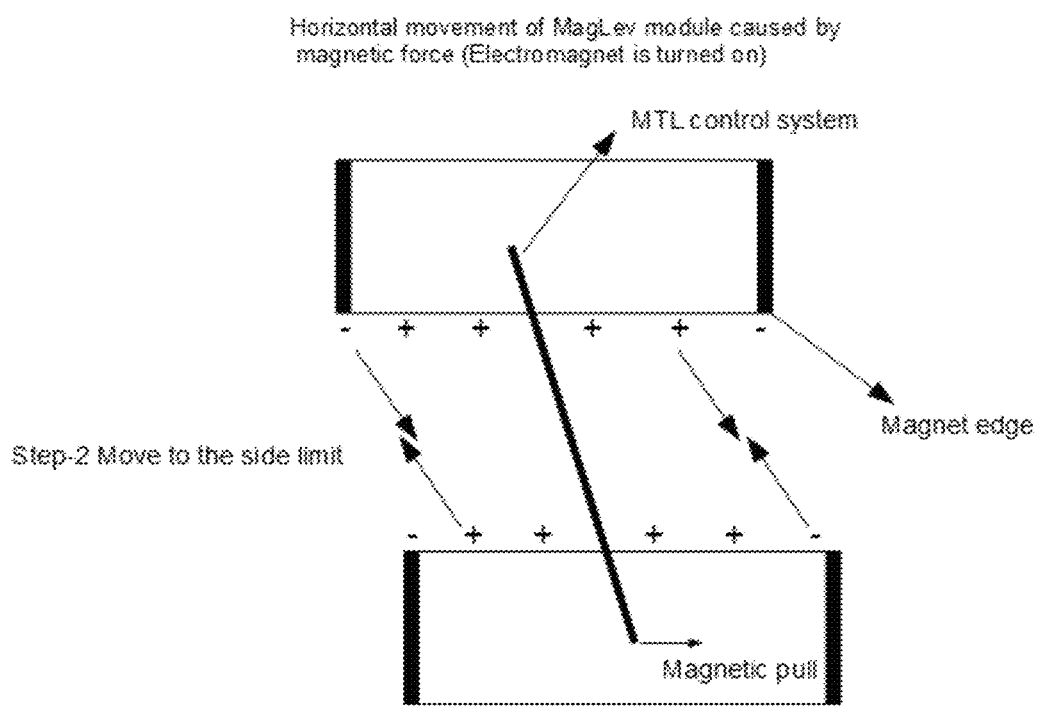
Figure 10C:
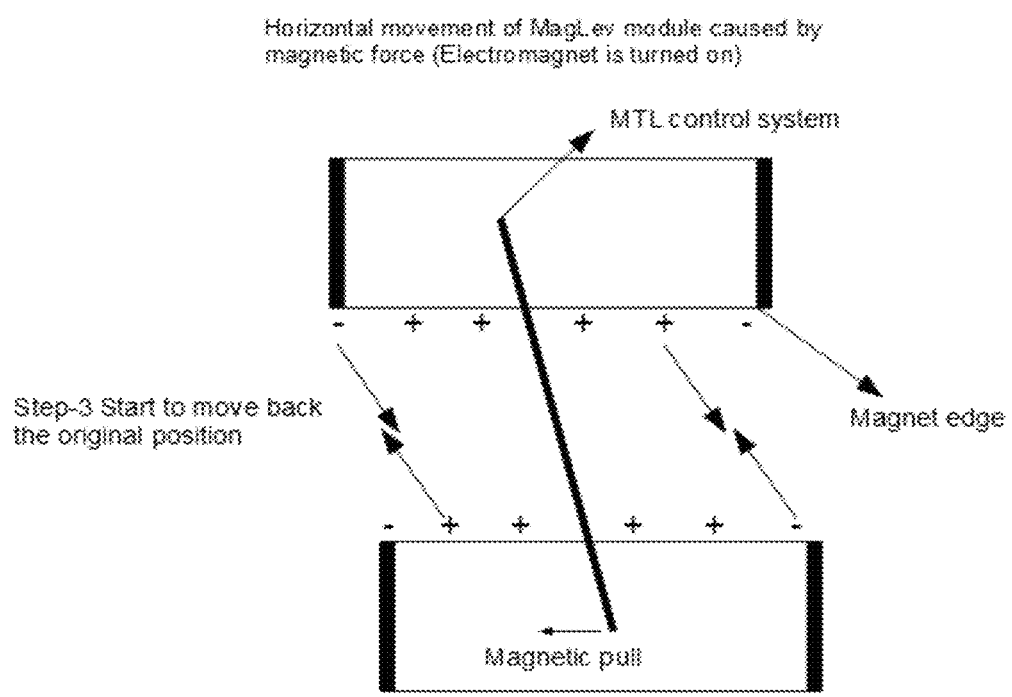
Figure 10D:
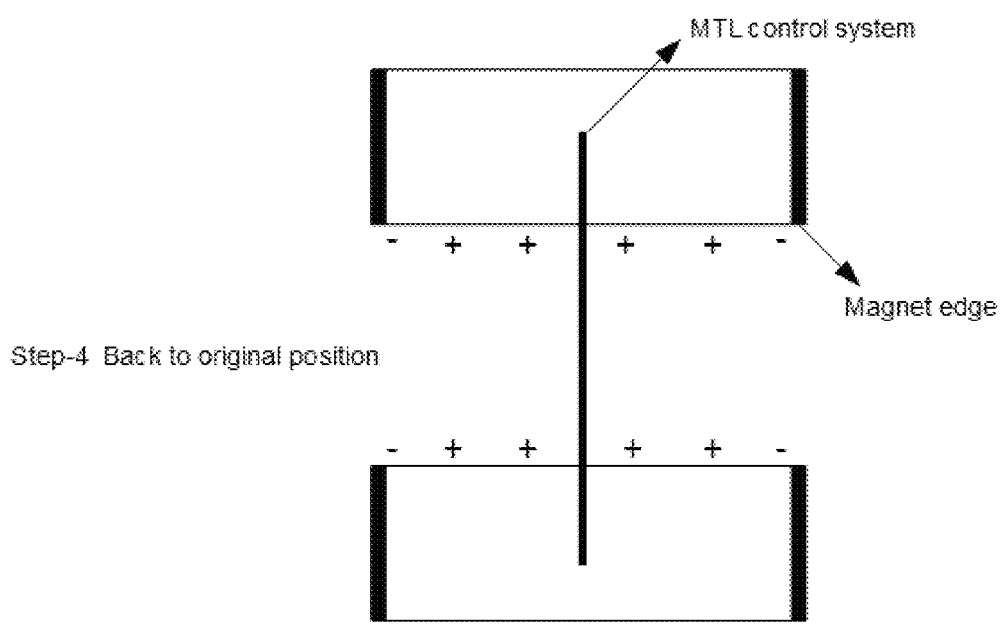

1. U.S. Pat. No. 3,604,027 A, Aug. 4, 1969-Sep. 14, 1971. Shunichi Konno. Construction for bed or chair.
2. U.S. Pat. No. 5,103,513 A, Aug. 25, 1988-Apr. 14, 1992. King E Autry. Magnetic-cushioned support for bed or seat.
3. U.S. Pat. No. 7,941,882 B1, Jul. 6, 2010-May 17, 2011. Jeremy Robert Strozer. Magnetic cushioning system.

What is claimed is:

1. MagLev module with MTL (Magnetic Tension Lock) control system applied in furniture and ice-breaking vessel comprises:
   (a) pairs of permanent magnets contained by top and bottom mounting plates to form the basis of a MagLev module, the top and bottom mounting plates having mounting holes;
   (b) MTL control system comprising a set or a plurality of sets, each set comprising a rod, mounting head, adjustable tension spacer, a top ring magnet, and a bottom ring magnet, wherein the mounting head, the adjustable tension spacer and the top ring magnet are positioned on a top end of the rod;
   (c) the MTL control system connecting the top and bottom mounting plates into a MagLev module via its rod being inserted into the mounting holes of the top and bottom mounting plates, the top end of the rod being inserted into the mounting holes of the top mounting plate and a bottom end of the rod is inserted into the mounting holes of the bottom mounting plate, and tuned by the tension spacer to guide the MagLev module movement.

2. MagLev module with MTL control system of claim 1, wherein the pairs of permanent magnets can be any rare-earth material and any grade.

3. MagLev module with MTL control system of claim 1, wherein the pairs of permanent magnets can be any shape.

4. MagLev module with MTL control system of claim 1, wherein the paired magnet can be of any dimension.

5. MagLev module with MTL control system of claim 1, wherein the pairs of permanent magnets can be any quantity more than one.

6. MagLev module with MTL control system of claim 1, wherein its load capacity can be adjusted by the magnet grade, size and quantity.

7. MagLev module with MTL control system of claim 1, wherein the MTL control system retains the MagLev module and guides its movement.

8. MagLev module with MTL control system of claim 1, wherein the horizontal swing of the MagLev module is controlled by the magnetic force of an electromagnet.

9. MagLev module with MTL control system of claim 8, wherein the electromagnet can be controlled by an oscillator circuit.

* * * * *